United States Patent [19]

Neefe

[11] 4,150,073

[45] Apr. 17, 1979

[54] METHOD OF CONTROLLING THE ADHESION OF A MOLDED PLASTIC LENS TO THE MOLD

[76] Inventor: Charles W. Neefe, P.O. Box 429, Big Spring, Tex. 79720

[21] Appl. No.: 874,934

[22] Filed: Feb. 3, 1978

Related U.S. Application Data

[63] Continuation-in-part of Ser. No. 793,388, May 25, 1977, abandoned.

[51] Int. Cl.² ............................................. B29D 11/00
[52] U.S. Cl. .......................................... 264/1; 264/39; 264/81
[58] Field of Search ...................... 264/1, 39, 81, 313, 264/334; 425/808

[56] References Cited

U.S. PATENT DOCUMENTS

| 3,034,403 | 5/1962 | Neefe | 264/1 |
| 3,380,718 | 4/1968 | Neefe | 264/1 |
| 3,423,488 | 1/1969 | Bowser | 264/1 |
| 3,428,533 | 2/1969 | Pickel | 264/1 |
| 3,619,446 | 11/1971 | Nauta | 264/313 |

*Primary Examiner*—James B. Lowe

[57] ABSTRACT

Controlling the adhesion of cast polymeric optical lenses to a resinous optical mold by exposing the mold surface to monomeric vapors thereby altering the surface characteristics of the resinous mold and increasing the adhesion to the lens material.

6 Claims, No Drawings

METHOD OF CONTROLLING THE ADHESION OF A MOLDED PLASTIC LENS TO THE MOLD

This application is a continuation-in-part of Ser. No. 793,388, filed May 25, 1977, now abandoned.

BACKGROUND OF THE INVENTION

The use of plastic materials for making optical lenses has increased rapidly for the past ten years. This is due to the availability of better plastic materials and the physical advantages of the plastic resins for specific application, such as ophthalmic lenses. The technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high, due to the problems caused by the shrinkage of the monomer when polymerized, which often breaks the expensive molds.

The current lens molds are fabricated from glass, each mold is individually ground and polished to the required specifications. To achieve accurate reproduction of the bifocal and lenticular molds is most difficult and expensive. This new process makes possible exact reproductions and has many other distinct advantages which will become apparent from the following disclosure.

An object is to provide a process for making inexpensive molds which may be made to identical specifications.

Another object is to provide a process whereby standard masters may be used to produce a large quantity of replica molds.

The lenses are made as follows:

A master positive mold having the curvature required on the finished lens is made from glass, stainless steel or other materials which withstand the molding pressures and temperature. Materials which may be electroplated or plated by vacuum disposition have also been used.

The master positive mold is placed in a sleeve, a molding grade of a resinous material such as polyimide, polycarbonate, polymethylpentene, polyethylene polypropylene, or other molding material is also placed in the sleeve. The sleeve and it's contents are heated to the softening point of the molding material, pressure is applied to form the negative lens mold. The sides of the master mold have been cut to a smaller diameter than the sleeve to provide an opening around the mold. When sufficient heat and pressure have been applied the molding compound will fill the area around the positive mold forming a cup-like cavity with a curved optical surface at the bottom. Either injection or compression molding may be used to produce the negative resinous mold. A liquid or syrup monomer material containing a suitable catalyst is placed over the optical surface of the mold and covered to prevent evaporation of the monomer. The liquid monomer is polymerized within the mold to form a solid monolithic mass. Ultraviolet light, microwave energy or heat may be used to speed the polymerization process. Thermosetting and crosslinked hard materials may be used to produce lenses which are very dimensionally stable and could not be made by injection or compression molding. This process is also suitable for the production of soft contact lenses made from Hydroxyethyl Methacrylate which cannot be made by compression or injection molding techniques.

It is not necessary to remove the hardened plastic lens material from the mold before cutting the convex curve. The mold may be placed in a suitable lathe or grinding machine and the second curvature cut and polished. The finished lens now has a molded concave surface and a convex curvature which was cut and polished without being removed from the disposable mold. The mold has served as a container for the monomer and provided the molded optical surface which may be aspheric or may be composed of two or more spherical segments. The cup-like mold also serves as the holding block to facilitate cutting to the required thickness. The thickness of the cup bottom may be measured before adding the liquid monomer and measurements may be taken during the cutting operation and the lens thickness determined by subtracting the thickness of the cup bottom. The mold also serves as a holding fixture during the polishing operation. The lens is supported by the optical surface present on the mold, therefore the lens material must adhere strongly to the supporting mold in order to withstand the forces of cutting and polishing. This adhesion may be controlled by:

1. Selecting the material from which the lens mold is made.
2. By coating the lens mold with an adhesive.
3. By treating the mold optical surface with a monomer prior to adding the lens material. Increasing the adhesion may be accomplished by placing the finished resinous mold in a closed container containing a volitable liquid monomer or crosslinking agent such as, hydroxypropyl methacrylate, tetramethylene dimethacrylate, allyl methacrylate, divinyl benzene, ethylene dimethacrylate, cyclohexyl methacrylate, acrylic acid and methacrylic acid. Allowing the monomer vapor to penetrate the resinous mold will improve the adhesion between the cast polymerized lens and the mold surface, enabling the lens to be cut and polished to extremely thin dimensions without separating from the supporting mold.
4. By treating the mold material with a solvent or release agent before forming the material into a lens mold.

PREFERRED EMBODIMENT

The nylon material Amidel, supplied by Union Carbide Corp., is molded by injection molding to provide the required negative optical surface. The mold is placed in a 150 ml bleaker containing a 20 ml flask of ethylene dimethacrylate and the bleaker is closed at room temperature for 24 hours, the mold is removed and filled with methyl methacrylate syrup, containing 0.03 percent by weight 2, 2' Azobis (2 methyl-propionitrile), warmed to 50° C. for 24 hours to form a solid, and post cured at 70° C. for 12 hours. The polymethylmethacrylate lens may now be cut and polished while firmly supported by the Amidel mold. Nylon, acrylic, diallylphthalate, and polyolefins have been successfully used as mold materials.

After the lens is processed to the required specifications, the lens is removed by sharply flexing the holding fixture, separating the finished optical lens from it's support.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

That which is claimed is:

1. A method of increasing the adhesion between a resinous lens mold and a polymerized polymeric lens material to allow the opposing side of the polymeric lens material to be cut and polished while supported within the resinous mold by the steps of: providing a resinous lens mold having a negative curved optical surface, exposing the resinous mold surface to the vapor of a volatile monomer, filling the resinous mold with a liquid lens monomer capable of polymerization, polymerizing the lens monomer to form a solid having a first optical surface with a positive optical curve adhering to the resinous mold, cutting and polishing a second optical surface on the opposing side of the lens material and then removing the lens from the resinous mold.

2. The method of claim 1 wherein the lens material is polymethylmethacrylate, the resinous lens mold is nylon and the resinous nylon mold surface is exposed to the vapor of ethylene dimethacrylate.

3. A method as in claim 1 wherein the lens material is hydroxyethyl methacrylate.

4. A method as in claim 1 wherein the mold material is polymethylpentene.

5. A method as in claim 1 wherein the mold material is polymethylpentene and the lens material is hydroxyethyl methacrylate.

6. A method as in claim 1 wherein the lens material is methylmethacrylate.

* * * * *